Sept. 16, 1969 E. FRISCH ET AL 3,467,076

HIGH MAGNETIC FLUX EXPERIMENTAL APPARATUS

Filed June 1, 1965 2 Sheets-Sheet 1

INVENTORS
Erling Frisch and
William C. Brenner.
BY A. Samuel Oddi

United States Patent Office 3,467,076
Patented Sept. 16, 1969

3,467,076
HIGH MAGNETIC FLUX EXPERIMENTAL APPARATUS

Erling Frisch, Pittsburgh, and William C. Brenner, Fox Chapel, Pittsburgh, Pa., assignors to Westinghouse Electric Corporation, Pittsburgh, Pa., a corporaion of Pennsylvania Filed June 1, 1965, Ser. No. 460,266
Int. Cl. A61b 17/52
U.S. Cl. 128—1.3 8 Claims

ABSTRACT OF THE DISCLOSURE

The present disclosure relates to experimental apparatus for the investigation of the effects of high magnetic fields on biological systems. The apparatus includes a magnetic circuit which comprises a central member and a pair of pole pieces disposed thereover. The pole pieces extend beyond the periphery of the center member to form an air gap therebetween. A magnetic winding, which may comprise a plurality of pancake coils electrically connected and being formed of hollow conductives, are disposed about the center member within the air gap so as to provide a high magnetic flux within the gap. A plurality of experimental cages are disposed within the air gap exterior of the magnetic winding to be in the presence of the high magnetic field. A cooling fluid may be applied to the hollow conductors of the magnetic winding to control the temperature of the environment.

The present invention relates to experimental apparatus for investigation of the effects of high magnetic fields, and more particularly to experimental apparatus for investigation of the effects of high magnetic fields on biological systems.

Recent investigations of possible uses for superconducting magnets and magnetohydrodynamic generators have given rise to the problem of possible effects of magnetic fields or flux on animal life. Heretofore it has been tactitly assumed that magnetic fields are harmless to life. Experiments conducted recently have shown however there to be a number of deleterious effects on animals due to magnetic fields. These experiments, however, were inconclusive in that the biological and physical parameters have been so ill-defined at the present time that it is impossible to determine the mechanism by which these deleterious effects may operate. It would therefore be highly advantageous to investigate the effects of high magnetic fields on primates to ascertain if there are any casual relationships between high magnetic fields or flux and such characteristics as lifetime, metabolic changes or aberrant behavior. It would also be of great interest to study the detailed effects of high magnetic fields on the central nervous system, blood chemistry, disease susceptibility, cell nutrition and multiplication, the reproductive system and genetics.

To conduct meaningful experiments and produce statistically significant results experimental facility must be designed to produce a homogeneous magnetic field of at least 10,000 gauss. Moreover, the experimental space must be readily accessible so that the experimental animals may be fed, cleaned and observed without physical removal from the magnetic field. There have been many prior designs for the general investigation of the effects of magnetic fields, however, none of these have been specifically designed for the investigation of biological systems. The typical design provided only a limited floor space because of the non-living nature of the experimental subject. Also the experimental space was enclosed between the coils and magnetic circuit of the structure because of the lack of necessity of investigating the subject matter in the presence of the magnetic field.

It is therefore an object of the present invention to provide new and improved experimental apparatus for investigating the effects of magnetic fields on biological systems.

It is a further object of the present invention to provide a new and improved experimental apparatus for investigating the effects of high magnetic fields on animals in which continuous experiments may be conducted with the animals constantly in the presence of the magnetic field.

It is a further object of the present invention to provide new and improved experimental apparatus in which the effects of high magnetic fields on animal life may be investigated wherein a substantial number of animals may be tested at one time and may be easily monitored and controlled in the continual presence of the magnetic field.

Broadly, the present invention provides an experimental apparatus in which a magnetic coil is utilized to produce a high magnetic field in a gap formed within a magnetic circuit which is disposed within and about the magnetic coil. Experimental spaces to contain primates or other experimental specimens are placed within the gap to be in the presence of the high magnetic field and yet be readily available to the exterior of the apparatus for monitoring and control of the experiments.

These and other objects and advantages of the present invention will become more apparent when considered in view of the following specification and drawings, in which.

Figure 1:
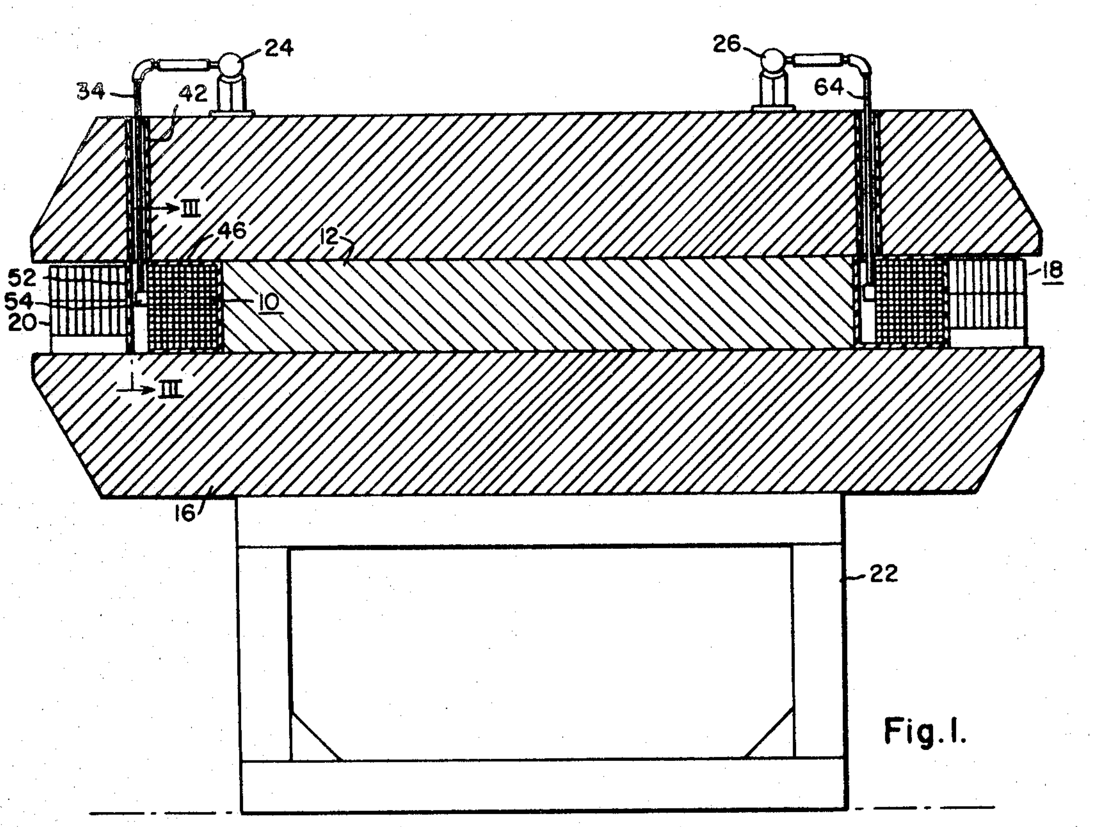
FIGURE 1 is a side sectional view of the experimental apparatus.
Figure 2:
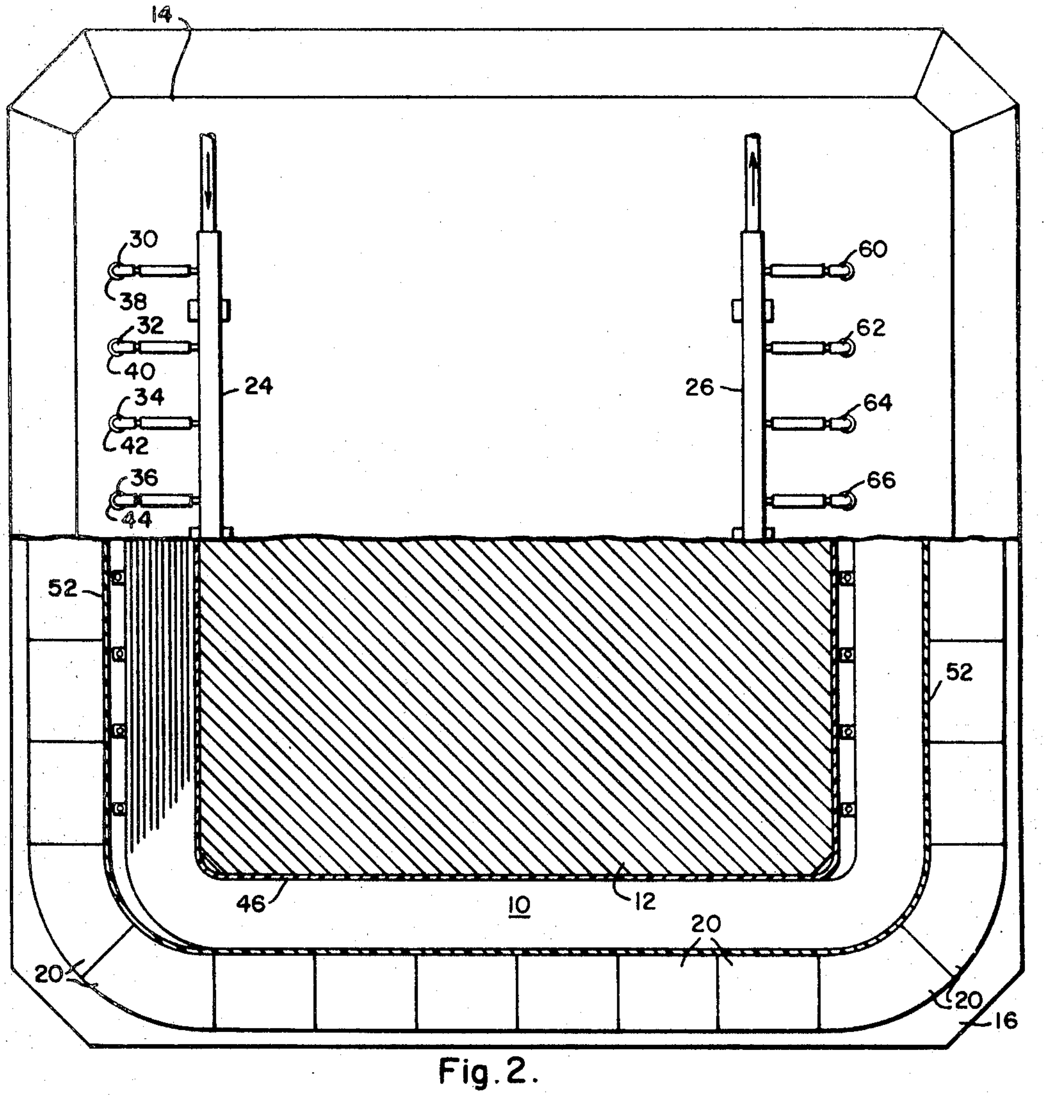
FIG. 2 is a top view in partial section of the experimental apparatus.

Referring to FIGS. 1 and 2, a magnetic winding 10 having a plurality of coils is wound in a substantially rectangular shape. To provide a high magnetic flux between and around the winding the winding is supplied with electrical energy from an external source, not shown. The magnetic winding 10 is wound about a center core member 12 which has substantially flat top and bottom surfaces. Disposed over the top and bottom surfaces of the center core member 12 is a top pole member 14 and a bottom pole member 16. The pole members 14 and 16 have substantially flat inner surfaces adjacent to the surfaces of the center core member 12, with the pole members 14 and 16 extending over the magnetic winding 10 exterior of the winding so that a gap 18 is formed around the periphery of the magnetic winding 10. The center core member 12 of the pole pieces 14 and 16 may, for example, comprise a soft magnetic material so as to provide a low reluctance path to the magnetic flux generated by the winding 10. A magnetic circuit is thus completed; from the center core member 12, through the top pole member 14, through the air gap 18, to the bottom pole piece 16 and back to the center core member 12. Because of this configuration a high magnetic field is applied in the gap 18, which is disposed exterior of the magnetic winding 10 between the pole pieces 14 and 16.

Within the gap 18 about the winding 10 are placed a plurality of experimental cages 20. The individual cages 20 are designed to contain experimental animals, for example, rats. The cages 20 thus appear in the high magnetic field established by the magnetic winding 10 and passing between the pole pieces 14 and 16 in the air gap 18.

The magnetic structure is supported by a support member 22 upon which the bottom pole member 16 rests. This is done so that the experimental apparatus will be placed at a height above the floor which permits ready monitoring and feeding of the animals within the cages 20 and also permits the easy cleaning of the cages and control of the experiment.

To cool the magnetic winding 10, a manifolding system through which a cooling fluid may be supplied to the winding 10 is provided. The manifolding system includes an input manifold 24 and an output manifold 26. As will be further explained below, a cooling fluid, such as water, is passed through the input manifold 24 at the exterior portion of the winding 10 adjacent the specimen cages 20 so as to cool the cages to a reasonable temperature for the animals. The cooling fluid is then exhausted from the exhaust manifold 26 from the inner portion of the coil 10.

Figure 3:
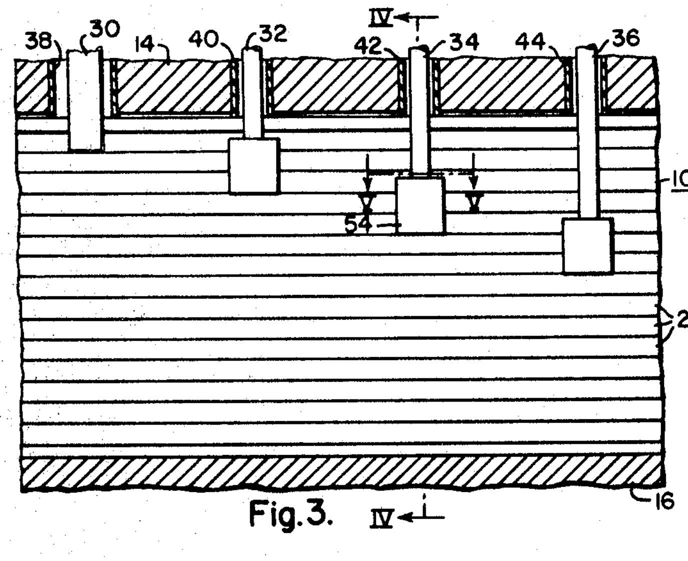
FIG. 3 is a sectional view taken along the line III—III of FIG. 1.
Figure 4:
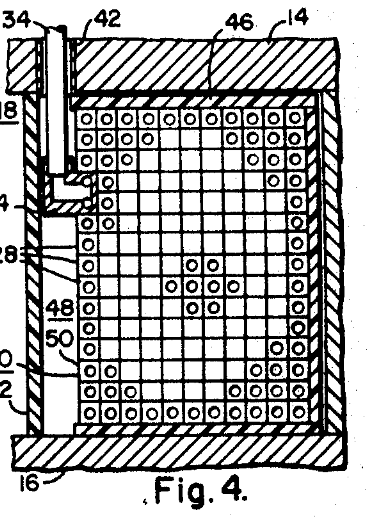
FIG. 4 is a sectional view taken along the line IV—IV of FIG. 3.

In FIGS. 3 and 4, the magnetic winding 10 is shown to comprise a plurality of pancake coils 28. The pancake coils comprise hollow conductors through which the cooling fluid may pass as applied thereto from the manifolding system. Each of the pancake coils 28 is electrically connected, as better shown in FIGS. 5, 6 and 7, with adjacent pancake coils being brazed at the respective manifold junction.

FIG. 3 shows a plurality of inlet manifolding pipes 30, 32, 34 and 36 extending downwardly through the top pole member 14 through a plurality of insulated holes 38, 40, 42 and 44, respectively, provided in the top pole member 14. The manifold input pipes 30, 32, 34 and 36 extend to different pairs of the pancake coil 28 so that cooling fluid may be supplied to all of the hollow conductors of the pancake coils 28. Each of the manifolding pipes must be insulated from the water manifold 24 or 26 by a section of insulating hose or an insulated joint between the manifold and the respective pipes.

FIG. 4 shows the inlet pipe 34 in more detail. An insulating layer 46 fits around the outside of the winding 10 adjacent to the center core member 12 and the pole members 14 and 16. The pipe 34 extends downwardly through the insulated tube 42 into a space 48, between the exterior surface 50 of the winding 10 and an insulating layer 52, which is disposed in the air gap 18 between the pole members 14 and 16. The pipe 34 fits into a manifold cover member 54 which has an opening therein to permit cooling fluid to pass from the pipe 34 into the cover 54 and thence into the pair of pancake coils to which the manifold cover is connected.

Figure 5:
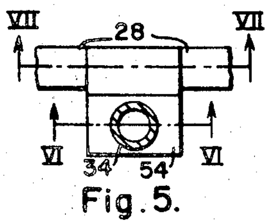
FIG. 5 is a partial sectional view taken along the line V—V of FIG. 3.
Figure 6:
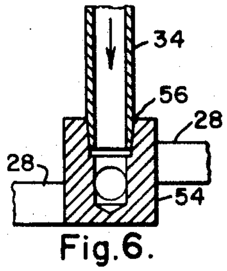
FIG. 6 is a sectional view taken along the line VI—VI of FIG. 5.
Figure 7:
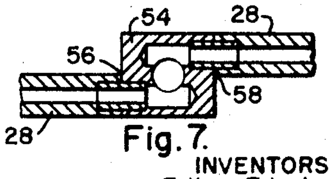
FIG. 7 is a sectional view taken along the line VII—VII of FIG. 5.

FIGS. 5, 6 and 7 better show the connection of the inlet pipe 34, the manifold cover 54 and the pancake coils 28. The pancake coils 28 are attached to the manifold cover 54 by the brazed joints 56 and 58. The arrows indicate that the cooling fluid enters down through the pipe 34 into the cover member 54 and then passes through the pancake coils 28 and through the hollow conductors thereof. The inlet pipe 34 is secured to the cover member 54, for example, also by brazing.

The water thus entering through the inlet pipe 34 circles around the pancake coils through the passages therein in a more or less spiral pattern to thereby cool the coils. The exterior portion of the coils are cooled to a greater degree since the cool inlet water is introduced at the outside of the winding 10 and then spirals inwardly. The purpose of these is to add additional cooling to the cages 30. The insulating layer 52 also aids in thermally insulating the cages from the winding 10. The cooling fluid spirals around toward the center of the pancake coils and then is extracted through the exhaust manifold 26 which has a plurality of exhaust pipes 60, 62, 64 and 66. The exhaust pipe 64 associated with the inlet pipe 34 is shown better in FIG. 1. The water thus entering from the inlet pipe 34, for example, circles around the associated pair of pancake coils and then is exhausted through the respective outlet pipes into the exhaust manifold 26.

The other inlet pipes extending from the inlet manifold 24 operate similarly with respect to other of the pancake coils 28 to thus cool all of the winding 10 with the outside portion of the winding receiving the cool inlet water and the heated water then being exhausted from the exhaust pipes to the exhaust manifold 26. Each of the connections of the inlet and outlet manifold connections are similar to that shown in FIGS. 5, 6 and 7. The hollow conductors utilized for the pancake coils may be of a square cross section for example so that a rectangular cross section coil may be provided within the magnetic circuit established by the center core member 12 and the pole members 14 and 16.

It can thus be seen that a low reluctance path is provided in the air gap 18 wherein the experimental cages 30 are placed. Moreover, the cages 30 have one side thereof exposed to the exterior of the apparatus which permits ready observation and control of the experiments taking place without the necessity of removing the animals from the presence of the high magnetic field. The application of the cooling fluid to the conductors of the winding 10 permits a controllable temperature to be present in the experimental environment. Furthermore, by placing the cages completely around the periphery of the winding adjacent to the insulating layer 52 a large number of cages may be utilized which greatly increases the number of animals that may be observed during a given testing sequence. Also each of the cages are present in a relatively homogeneous magnetic field due to the quality of the magnetic circuit provided about the cages 30 within the air gap 18.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In experimental apparatus, the combination of: a magnetic winding for providing a magnetic field, a magnetic structure disposed about said winding and forming a gap exterior of said winding so that a magnetic field appears in said gap; and a plurality of experimental cages being disposed within said gap around the periphery of said winding to be in the presence of the magnetic field in said gap.

2. In experimental apparatus, the combination of: a magnetic winding for providing a magnetic field, a magnetic structure disposed within and about said winding and forming a gap exterior of said winding so that a magnetic field appears in said gap; a plurality of experimental cages being disposed within said gap around the periphery of said winding to be in the presence of the magnetic field in said gap; and cooling means to cool said magnetic winding.

3. In high magnetic flux experimental apparatus, the combination of: a magnetic winding comprising a plurality of pancake coils electrically connected and being formed of hollow conductors; a magnetic structure for providing a low reluctance path to the magnetic flux provided by said magnetic winding, said magnetic structure being disposed within and about said winding and forming a gap exterior of the outer periphery of said winding and with a high magnetic flux being provided in said gap; and a plurality of experimental cages disposed within said gap around the periphery of said winding to be in the presence of the high magnetic flux therein.

4. In high magnetic flux experimental apparatus, the combination of: a magnetic winding for providing a high magnetic flux, a magnetic structure for providing a low reluctance path to the magnetic flux provided by said magnetic winding, said magnetic structure being disposed within and about said winding and forming a gap exterior of the outer periphery of said winding and with a high magnetic flux being provided in said gap; a plurality of experimental cages disposed within said gap around the periphery of said winding to be in the presence of the high magnetic flux therein; and cooling means to cool said magnetic winding.

5. In high magnetic flux experimental apparatus the combination of: a magnetic winding for providing a high magnetic flux, a magnetic structure for providing a low reluctance path to the magnetic flux provided by said winding, said magnetic structure comprising a pair of pole members and a center member disposed therebetween, said pole members extending beyond the periphery of said center member to form a gap therebetween, said winding being disposed about said center member and within said gap, and a plurality of experimental cages disposed within said gap adjacent the outer periphery of said winding to be in the presence of the high magnetic flux within said gap.

6. In high magnetic flux experimental apparatus, the combination of: a magnetic winding for providing a high magnetic flux; a magnetic structure for providing a low reluctance path to the magnetic flux provided by said winding, said magnetic structure comprising a center member disposed between a pair of pole members, said pole members extending beyond the periphery of said center member to form a gap therebetween, said winding being disposed about said center member and within said gap; a plurality of experimental cages disposed within said gap to be in the presence of the high magnetic flux within said gap; and cooling means to supply a cooling fluid to said magnetic winding.

7. In high magnetic flux experimental apparatus, the combination of: a magnetic winding for providing a high magnetic flux, said magnetic winding comprising a plurality of pancake coils electrically connected and being formed of hollow conductors; a magnetic structure comprising a soft magnetic material for providing a low reluctance path to the magnetic flux provided by said magnetic winding, said magnetic structure being disposed within and about said winding and forming a gap exterior of the outer periphery of said winding and with a high magnetic flux being provided in said gap; a plurality of experimental cages disposed within said gap around the periphery of said winding to be in the presence of the high magnetic flux therein; and manifolding means to supply a cooling fluid to said hollow conductors adjacent said experimental cages and to exhaust the fluid from conductors adjacent the inner periphery of said pancake coils.

8. In high magnetic flux experimental apparatus, the combination of: a magnetic winding for providing a high magnetic flux, said magnetic winding comprising a plurality of pancake coils electrically connected and being formed of hollow conductors; a magnetic structure comprising a soft magnetic material for providing a low reluctance path to the magnetic flux provided by said winding, said magnetic structure comprising a center member disposed between a pair of pole members, said pole members extending beyond the periphery of said center member to form a gap therebetween, said winding being disposed about said center member and within said gap; a plurality of experimental cages disposed within said gap adjacent the outer periphery of said winding to be in the presence of the high magnetic flux within said gap; and manifolding means to supply cooling fluid to said hollow conductors adjacent said experimental spaces and to exhaust the fluid from conductors adjacent the inner periphery of said coils.

References Cited

UNITED STATES PATENTS

| | | | |
|---|---|---|---|
| 3,054,026 | 9/1962 | Lovell | 317—123 |
| 3,295,082 | 12/1966 | Kustom et al. | 335—297 |

OTHER REFERENCES

Lineback: "Hand Magnet," pp. 840–841, Am. J. of Op:h., June 1, 1949.

Barnothy: "Magnetic Field," pp. 577–578, Nature, Mar. 24, 1956.

Alexander: "Biomagnetics," p. 186, Am. J. Med. Electronics, July–Sept. 1962.

CHARLES F. ROSENBAUM, Primary Examiner

U.S. Cl. X.R.

335—297